United States Patent
Miao

(10) Patent No.: US 12,414,133 B2
(45) Date of Patent: Sep. 9, 2025

(54) SYSTEMS, METHODS, AND DEVICES FOR SECONDARY CELL ACTIVATION

(71) Applicant: Intel Corporation, Santa Clara, CA (US)

(72) Inventor: Honglei Miao, Munich (DE)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 17/640,342

(22) PCT Filed: Sep. 9, 2020

(86) PCT No.: PCT/US2020/049791
§ 371 (c)(1),
(2) Date: Mar. 4, 2022

(87) PCT Pub. No.: WO2021/086499
PCT Pub. Date: May 6, 2021

(65) Prior Publication Data
US 2022/0345278 A1    Oct. 27, 2022

(30) Foreign Application Priority Data

Oct. 29, 2019  (EP) .................................... 19205886

(51) Int. Cl.
*H04W 72/231*    (2023.01)
*H04L 1/00*    (2006.01)
(Continued)

(52) U.S. Cl.
CPC ......... *H04W 72/231* (2023.01); *H04L 1/0026* (2013.01); *H04L 1/0027* (2013.01);
(Continued)

(58) Field of Classification Search
CPC .................................................. H04W 72/231
See application file for complete search history.

(56) References Cited

U.S. PATENT DOCUMENTS

2016/0128003 A1* 5/2016 Callender ........... H04W 52/365
370/311
2016/0277172 A1 9/2016 Yu et al.
(Continued)

FOREIGN PATENT DOCUMENTS

EP        3291624 A1      3/2018
KR     20180055662 A      5/2018
(Continued)

OTHER PUBLICATIONS

International Search Report issued for the corresponding International Application No. PCT/US2020/049791, dated Dec. 15, 2020, 2 pages (for informational purposes only).
(Continued)

*Primary Examiner* — Jason E Mattis
(74) *Attorney, Agent, or Firm* — Viering, Jentschura & Partner mbB

(57) ABSTRACT

The present disclosure includes systems, methods, and devices that can provide fast secondary cell (SCell) activation in a wireless communication network. In various embodiments, the methods and devices, including access nodes and mobile radio communication terminals, may use medium access control (MAC) control elements (CEs) commands that facilitate fast SCell activation.

23 Claims, 12 Drawing Sheets

(51) Int. Cl.
*H04L 1/1607* (2023.01)
*H04L 5/00* (2006.01)
*H04W 76/15* (2018.01)

(52) U.S. Cl.
CPC .......... *H04L 1/0031* (2013.01); *H04L 1/1607* (2013.01); *H04L 5/0055* (2013.01); *H04W 76/15* (2018.02)

(56) References Cited

U.S. PATENT DOCUMENTS

| | | | | |
|---|---|---|---|---|
| 2018/0131431 | A1* | 5/2018 | Dinan | H04L 1/0026 |
| 2019/0124558 | A1 | 4/2019 | Ang et al. | |
| 2019/0207705 | A1* | 7/2019 | Zhou | H04W 52/221 |
| 2019/0254110 | A1* | 8/2019 | He | H04L 41/0896 |
| 2019/0306867 | A1 | 10/2019 | Cirik et al. | |
| 2019/0320379 | A1 | 10/2019 | Dinan | |
| 2022/0053568 | A1* | 2/2022 | Xing | H04W 72/1273 |
| 2022/0167267 | A1* | 5/2022 | Ma | H04W 52/0235 |
| 2022/0167359 | A1* | 5/2022 | Miao | H04W 72/21 |
| 2022/0264461 | A1* | 8/2022 | Chen | H04W 72/23 |

FOREIGN PATENT DOCUMENTS

| | | |
|---|---|---|
| WO | 2012023839 A2 | 2/2012 |
| WO | 2017218749 A1 | 12/2017 |

OTHER PUBLICATIONS

European Search Report issued for the corresponding European Application No. EP 19 20 5886.5 , dated Jul. 15, 2020, 11 pages (for informational purposes only).

3rd Generation Partnership Project, "Medium Access Control (MAC) protocol specification", dated Sep. 2018, 76 pages, TS 38.321, V15.3.0, Release 15.

3rd Generation Partnership Project, "Requirements for support of radio resource management", dated Sep. 2018, 136 pages, TS 38.133, V15.3.0, Release 15.

3rd Generation Partnership Project, "Wid on Multi-RAT Dual-Connectivity and Carrier Aggregation enhancements","WID on DC and CA enhancements", dated Sep. 10-13, 2018, 5 pages, TSG-RAN#81, Gold Coast, Australia.

3rd Generation Partnership Project, "Radio Resource Control (RRC) protocol specification", dated Sep. 2018, 445 pages, TS 38.331, V15.3.0, Release 15.

* cited by examiner

SYSTEMS, METHODS, AND DEVICES FOR SECONDARY CELL ACTIVATION

CROSS-REFERENCE TO RELATED APPLICATION(S)

This is a national phase application of PCT/US2020/049791, filed on Sep. 9, 2020, which claims priority to EP Application No. 19 205 886.5 filed on Oct. 29, 2019, the contents of each of which are incorporated by reference herein in their entirety.

TECHNICAL FIELD

Various embodiments relate generally to the field of wireless communications.

BACKGROUND

In 3GPP (Third Generation Partnership Project) Release 15 (Rel-15) new radio (NR), the carrier aggregation (CA) activation/deactivation command is sent in medium access control (MAC) control element (CE), the minimum required activation delay is approximately 5 ms for a typical case. This is much slower in contrast to other NR procedures. Furthermore, the maximum allowed activation delays is a big concern for CA operation for the services with stringent latency requirements, and similar issues already existed for Long Term Evolution (LTE) CA operation as well. Due to such long delays, it is risky for the network to frequently deactivate the secondary cell (SCell) due to the fact that bringing the UE back to Scell activated state can take any time from a minimum of approximately 5 ms to a maximum allowed value of tens or hundreds of milliseconds depending on the specific scenario and UE implementation.

A new key element or feature in NR is to enable the possibility of utilizing much larger spectrum bandwidths, ultimately leading to approximately 10 times higher peak data rates than LTE. Delays in accessing the high capacity (small) cells are detrimental to the performance and in NR this can be even more pronounced (e.g. especially if macro is still LTE). In order to fully take advantage on the large bandwidth (BW) possibilities, efficient and fast utilization of the large BW should be ensured in all cases, including initial connection establishment, reconfiguration of CA and dual connectivity (DC) and addition of secondary cells.

SUMMARY

In various exemplary embodiments of the present disclosure, a short Channel Quality Indicator (CQI) reporting can be achieved, e.g., during the initial phase of SCell activation period, by two stages: 1) an access node device (e.g., gNB) transmits/sends (e.g., concurrently) two MAC CEs for SCell activation and Semi-Persistent Channel State Information (SP-CSI) reporting on Physical Uplink Control Channel (PUCCH) activation to a mobile radio communication terminal device (e.g., user equipment); and 2) the access node device later sends a MAC CE for SP CSI reporting on PUCCH deactivation to the user equipment (UE). In various examples, the MAC CEs in the first stage may initiate the SCell activation and the start of short CQI reporting, e.g., the mobile radio communication device begins periodic Channel State Information (CSI) reporting on PUCCH. Further, the MAC CE in second stage may signal the end of the short CQI reporting. The two-stage based short CQI reporting may allow SCell activation delay to be fully controlled by the configuration of SP CSI resources and the reporting periodicity dedicated for short CQI reporting (which may independent from SS/PBCH (Sychronization Signal/Physical Broadcast Channel) Block Measurement Time Configuration (SMTC) periodicity). As a result, SCell activation delay can be significantly reduced.

Further, in various exemplary embodiments, an access node device (e.g., a gNB) sends/transmits a MAC CE for SCell activation command to a mobile radio communication device (e.g., a UE), and signals the timing, e.g., a value of k1 (offset), for Hybrid Automatic Repeat Request-Acknowledgement (HARQ-ACK) feedback in downlink control information (DCI). After sending HACK-ACK feedback, the UE may starts to transmit periodic channel state information (CSI) feedback for the SCell being activated by using configured PUCCH resources. After receiving the first CSI report of SCell being activated from UE, the gNB may be allowed to schedule PDCCH/PDSCH (Physical Downlink Control Channel/Physical Downlink Shared Channel) transmission in the SCell being activated, and UE may start to monitor the activated SCell.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
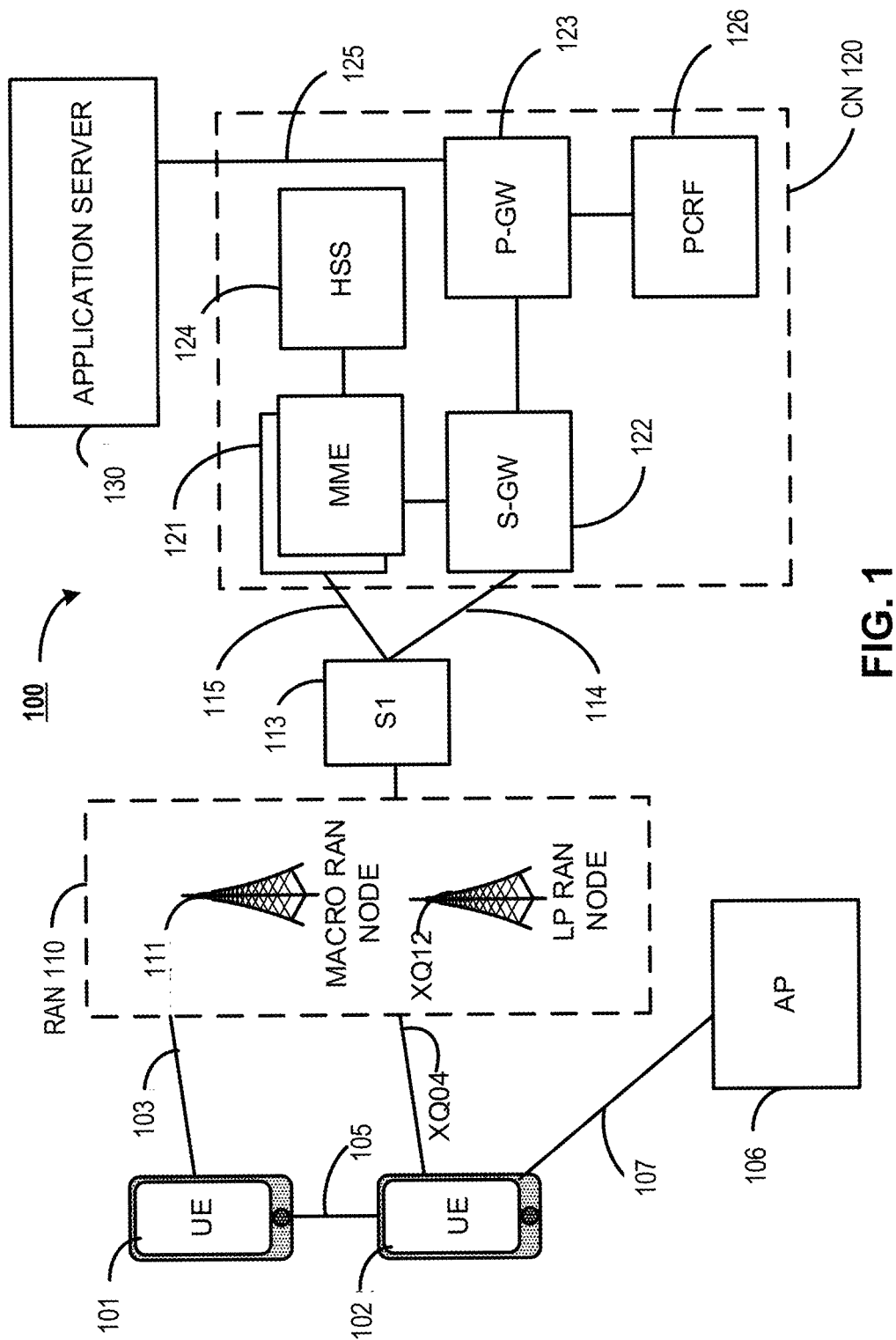
FIG. 1 illustrates an exemplary architecture of a system of a network in accordance with various embodiments.

FIG. 1 illustrates an architecture of a system 100 of a network in accordance with some embodiments. The system 100 is shown to include a user equipment (UE) 101 and a UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (e.g., handheld touchscreen mobile computing devices connectable to one or more cellular networks), but may also include any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 101 and 102 may include an Internet of Things (IoT) UE, which may include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which includes a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink (SL) interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as Vehicle-to-everything (V2X) systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). These V2X applications can use "cooperative awareness" to provide more intelligent services for end-users. For example, vehicle UEs (vUEs) 101, 102, RAN nodes 111, 112, application servers 130, and pedestrian UEs 101, 102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 may be implemented/employed as Vehicle Embedded Communications Systems (VECS) or vUEs.

The UE 102 is shown to be configured to access an access point (AP) 106 (also referred to as "WLAN node 106", "WLAN 106", "WLAN Termination 106" or "WT 106" or the like) via connection 107. The connection 107 may include a local wireless connection, such as a connection consistent with any IEEE 802.11 protocol, wherein the AP 106 may include a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header, thereby protecting the original header of the IP packets.

The RAN 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and may include ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management (MM).

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals may include a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively.

The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and HARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, $L=1, 2, 4,$ or $8$).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U (S1 for the user plane) interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 includes the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may include a database for network users, including subscription-related information to support the network entities' handling of communication sessions. The CN 120 may include one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 120 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The components shown herein may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I²C interface, an SPI interface, point to point interfaces, and a power bus, among others.

Figure 2:
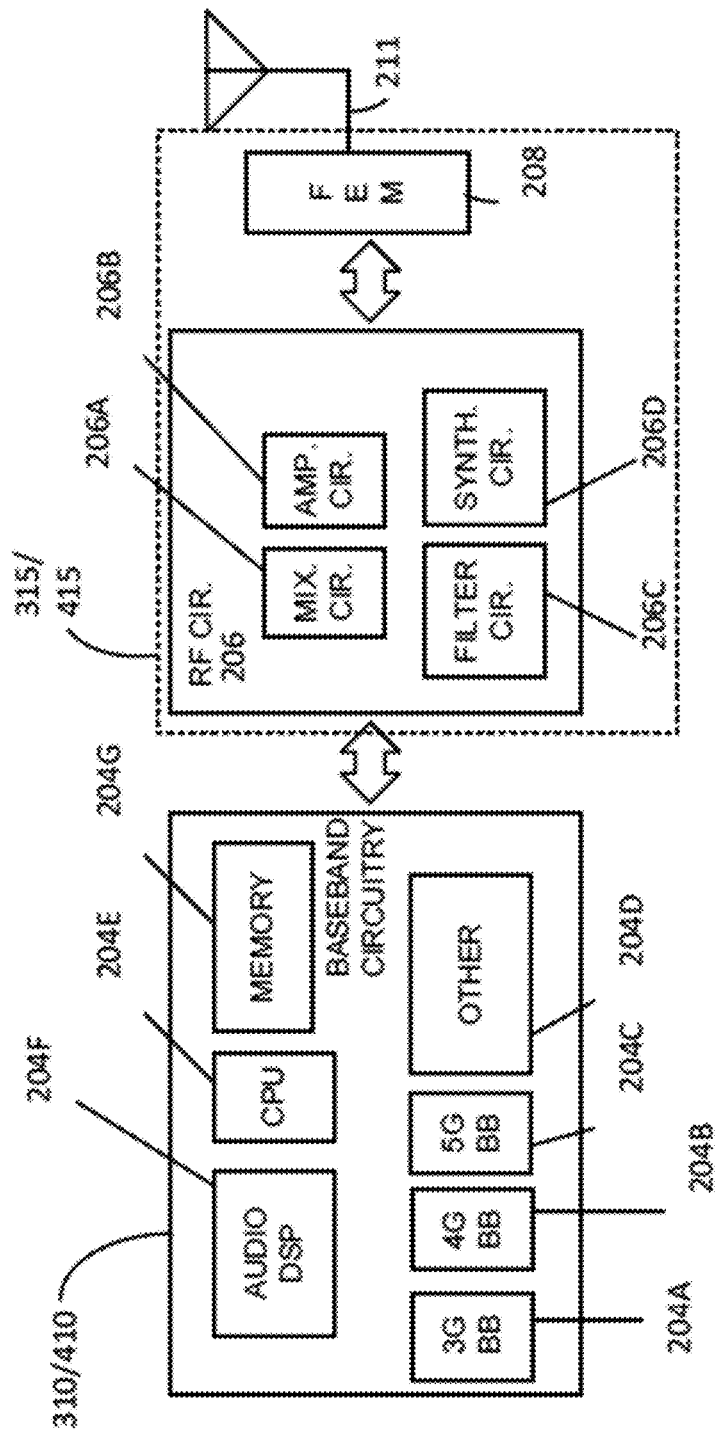
FIG. 2 illustrates example components of baseband circuitry and radio front end modules in accordance with various embodiments.

FIG. 2 illustrates example components of baseband circuitry 210 and radio front end modules (RFEM) 215 in accordance with some embodiments. As shown, the RFEM 215 may include Radio Frequency (RF) circuitry 206, front-end module (FEM) circuitry 208, one or more antennas 211 coupled together at least as shown.

The baseband circuitry 210 may include circuitry such as, but not limited to, one or more single-core or multi-core processors. The baseband circuitry 210 may include one or more baseband processors or control logic to process baseband signals received from a receive signal path of the radio frequency (RF) circuitry 206 and to generate baseband signals for a transmit signal path of the RF circuitry 206. Baseband processing circuitry 210 may interface with the application circuitry for generation and processing of the baseband signals and for controlling operations of the RF circuitry 206. For example, in some embodiments, the baseband circuitry 210 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 210 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 210 may include Fast-Fourier Transform (FFT), precoding, or constellation mapping/demapping functionality. In some embodiments, encoding/decoding circuitry of the baseband circuitry 210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 210 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 210 and an application circuitry may be implemented together such as, for example, on a system on a chip (SoC).

In some embodiments, the baseband circuitry 210 may provide for communication compatible with one or more radio technologies. For example, in some embodiments, the baseband circuitry 210 may support communication with an evolved universal terrestrial radio access network (EU- TRAN) or other wireless metropolitan area networks (WMAN), a wireless local area network (WLAN), a wireless personal area network (WPAN). Embodiments in which the baseband circuitry 210 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 210. RF circuitry 206 may also include a transmit signal path which may include circuitry to up-convert baseband signals provided by the baseband circuitry 210 and provide RF output signals to the FEM circuitry 208 for transmission.

In some embodiments, the receive signal path of the RF circuitry 206 may include mixer circuitry 206A, amplifier circuitry 206B and filter circuitry 206C. In some embodiments, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some embodiments, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 210 for further processing. In some embodiments, the output baseband signals may be zero-frequency baseband signals, although this is not a requirement. In some embodiments, mixer circuitry 206A of the receive signal path may include passive mixers, although the scope of the embodiments is not limited in this respect.

In some embodiments, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 210 and may be filtered by filter circuitry 206C.

In some embodiments, the mixer circuitry 206A of the receive signal path and the mixer circuitry 206A of the transmit signal path may include two or more mixers and may be arranged for quadrature downconversion and upconversion, respectively. In some embodiments, the mixer circuitry 206A of the receive signal path and the mixer circuitry 206A of the transmit signal path may include two or more mixers and may be arranged for image rejection (e.g., Hartley image rejection). In some embodiments, the mixer circuitry 206A of the receive signal path and the mixer circuitry 206A may be arranged for direct downconversion and direct upconversion, respectively. In some embodiments, the mixer circuitry 206A of the receive signal path and the mixer circuitry 206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 210 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206D may be a fractional-N synthesizer or a fractional N/N+1 synthesizer, although the scope of the embodiments is not limited in this respect as other types of frequency synthesizers may be suitable. For example, synthesizer circuitry 206D may be a delta-sigma synthesizer, a frequency multiplier, or a synthesizer including a phase-locked loop with a frequency divider.

The synthesizer circuitry 206D may be configured to synthesize an output frequency for use by the mixer circuitry 206A of the RF circuitry 206 based on a frequency input and a divider control input. In some embodiments, the synthesizer circuitry 206D may be a fractional N/N+1 synthesizer.

In some embodiments, frequency input may be provided by a voltage controlled oscillator (VCO), although that is not a requirement. Divider control input may be provided by either the baseband circuitry 210 or the applications processor 305/405 depending on the desired output frequency. In some embodiments, a divider control input (e.g., N) may be determined from a look-up table based on a channel indicated by the applications processor 305/405.

Synthesizer circuitry 206D of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 211, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 211. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX (transmitter/receive) switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 511).

Processors of the application circuitry 305/405 and processors of the baseband circuitry 210 may be used to execute elements of one or more instances of a protocol stack. For example, processors of the baseband circuitry 310/40, alone or in combination, may be used execute Layer 3, Layer 2, or Layer 1 functionality, while processors of the baseband circuitry 210 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry" or "processing circuitry". As used herein, the term "processor circuitry" may refer to, is part of, or includes circuitry capable of sequentially and automatically carrying out a sequence of arithmetic or logical operations; and recording, storing, and/or transferring digital data. The term "processor circuitry" or "processing circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Figure 3:
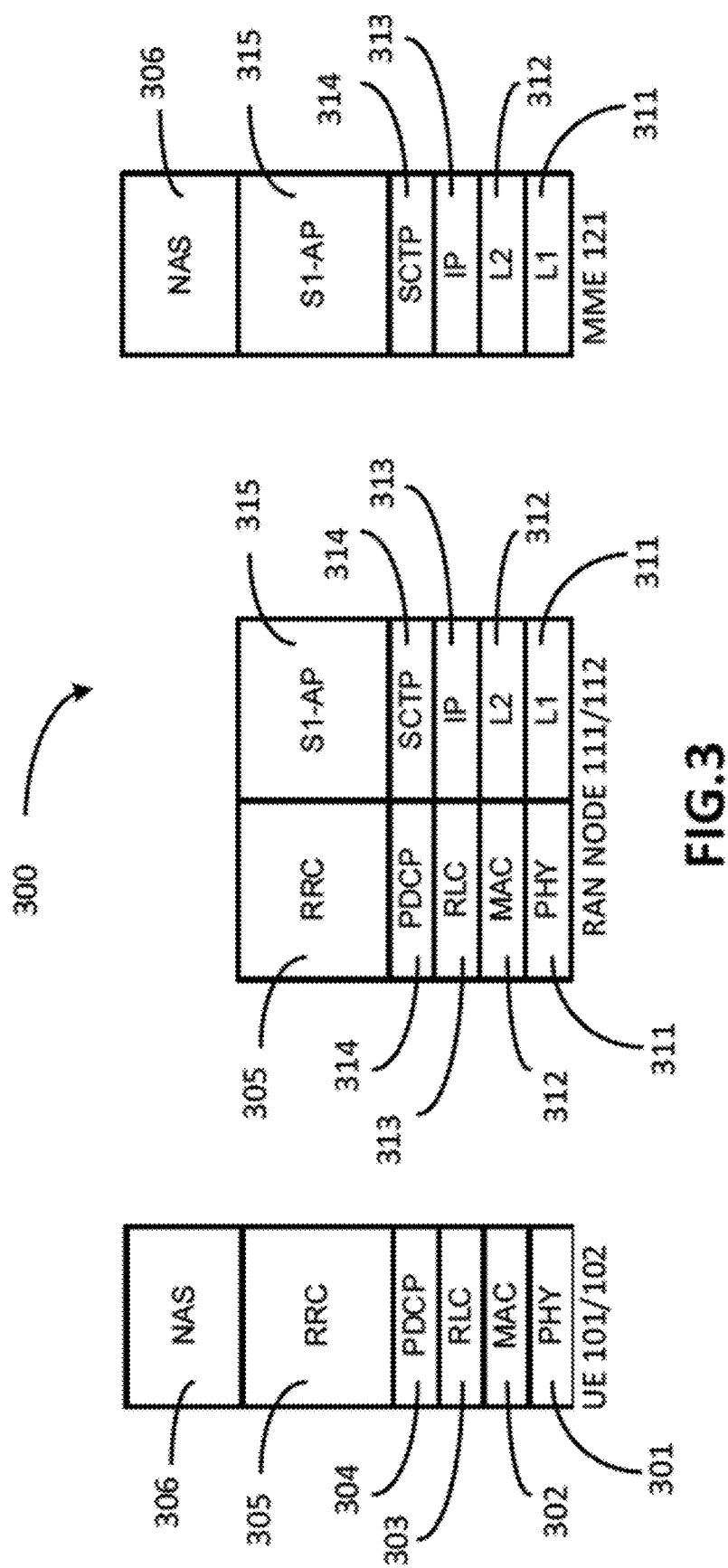
FIG. 3 shows an illustration of an exemplary control plane protocol stack in accordance with various embodiments.

FIG. 3 is an illustration of a control plane protocol stack in accordance with some embodiments. In this embodiment, a control plane 300 is shown as a communications protocol stack between the UE 101 (or alternatively, the UE 102), the RAN node 111 (or alternatively, the RAN node 112), and the MME 121.

The physical layer (PHY) 301 may transmit or receive information used by the MAC layer 302 over one or more air interfaces. The PHY layer 301 may further perform link adaptation or adaptive modulation and coding (AMC), power control, cell search (e.g., for initial synchronization and handover purposes), and other measurements used by higher layers, such as the RRC layer 305. The PHY layer 301 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 302 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 303 may operate in a plurality of modes of operation, including: Transparent Mode (TM), Unacknowledged Mode (UM), and Acknowledged Mode (AM). The RLC layer 303 may execute transfer of upper layer protocol data units (PDUs), error correction through automatic repeat request (ARQ) for AM data transfers, and concatenation, segmentation and reassembly of RLC SDUs for UM and AM data transfers. The RLC layer 303 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 304 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 305 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may include one or more information elements (IEs), which may each include individual data fields or data structures.

The UE 101 and the RAN node 111 may utilize a Uu interface (e.g., an LTE-Uu interface) to exchange control plane data via a protocol stack including the PHY layer 301, the MAC layer 302, the RLC layer 303, the PDCP layer 304, and the RRC layer 305.

The non-access stratum (NAS) protocols 306 form the highest stratum of the control plane between the UE 101 and the MME 121. The NAS protocols 306 support the mobility of the UE 101 and the session management (SM) procedures to establish and maintain IP connectivity between the UE 101 and the P-GW 123.

The S1 Application Protocol (S1-AP) layer 315 may support the functions of the S1 interface and include Elementary Procedures (EPs). An EP is a unit of interaction between the RAN node 111 and the CN 120. The S1-AP layer services may include two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 314 may ensure reliable delivery of signaling messages between the RAN node 111 and the MME 121 based, in part, on the IP protocol, supported by the IP layer 313. The L2 layer (e.g., data link layer) 312 and the L1 layer (e.g., physical layer) 311 may refer to communication links (e.g., wired or wireless) used by the RAN node and the MME to exchange information.

The RAN node 111 and the MME 121 may utilize an S1-MME interface to exchange control plane data via a protocol stack including the L1 layer 311, the L2 layer 312, the IP layer 313, the SCTP layer 314, and the S1-AP layer 315.

Figure 4:
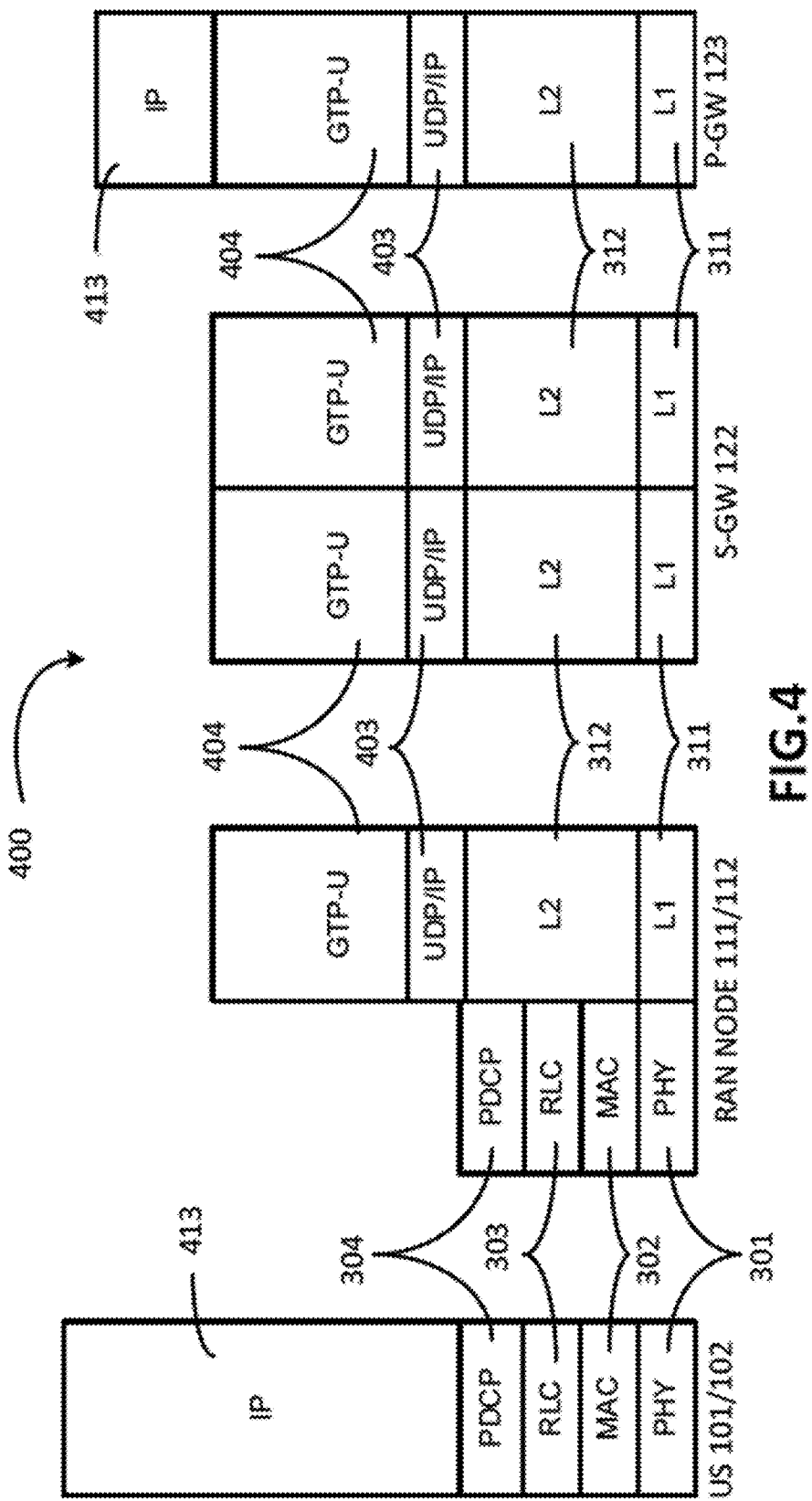
FIG. 4 is an illustration of an exemplary user plane protocol stack in accordance with various embodiments.

FIG. 4 is an illustration of a user plane protocol stack in accordance with some embodiments. In this embodiment, a user plane 400 is shown as a communications protocol stack between the UE 101 (or alternatively, the UE 102), the RAN node 111 (or alternatively, the RAN node 112), the S-GW 122, and the P-GW 123. The user plane 400 may utilize at least some of the same protocol layers as the control plane 300. For example, the UE 101 and the RAN node 111 may utilize a Uu interface (e.g., an LTE-Uu interface) to exchange user plane data via a protocol stack including the PHY layer 301, the MAC layer 302, the RLC layer 303, the PDCP layer 304.

The General Packet Radio Service (GPRS) Tunneling Protocol for the user plane (GTP-U) layer 404 may be used for carrying user data within the GPRS core network and between the radio access network and the core network. The user data transported can be packets in any of Internet Protocol Version 4 (IPv4), (Internet Protocol Version 6) IPv6, or Point-to-Point Protocol (PPP) formats, for example. The UDP and IP security (UDP/IP) layer 403 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack including the L1 layer 311, the L2 layer 312, the UDP/IP layer 403, and the GTP-U layer 404. The S-GW 122 and the P-GW 123 may utilize an S5/S8a interface to exchange user plane data via a protocol stack including the L1 layer 311, the L2 layer 312, the UDP/IP layer 403, and the GTP-U layer 404. As discussed above with respect to FIG. 3, NAS protocols support the mobility of the UE 101 and the session management procedures to establish and maintain IP connectivity between the UE 101 and the P-GW 123.

Figure 5:
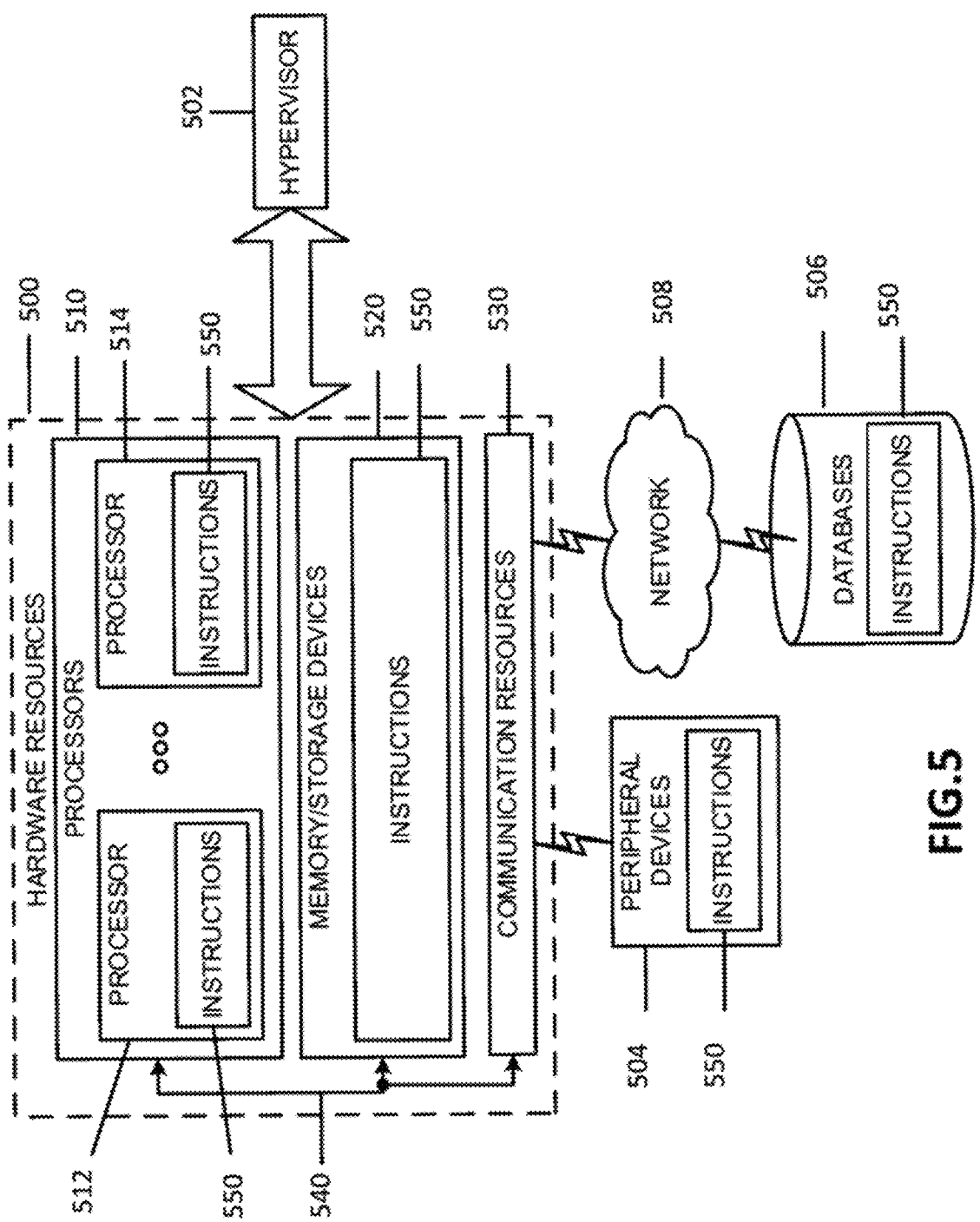
FIG. 5 shows a block diagram illustrating exemplary components, according to various embodiments.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. For one embodiment, FIG. 5 shows a diagrammatic representation of hardware resources 500 including one or more processors (or processor cores) 510, one or more memory/storage devices 520, and one or more communication resources 530, each of which may be communicatively coupled via a bus 540. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 502 may be executed to provide an execution environment for one or more network slices/subslices to utilize the hardware resources 500. A "virtualized resource" may refer to compute, storage, and/or network resources provided by virtualization infrastructure to an application, device, system, etc.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 550 may include software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below in the example section. In another example, circuitry associated with a UE, a base station (e.g., a data network (DN), a gNodeB, access node etc.), a network element, etc., as described above in connection with one or more of the preceding figures may be configured to operate in accordance with one or more of the examples set forth below in the example section.

In accordance with one or more exemplary embodiments of the present disclosure, a method includes using concurrent two medium access control (MAC) Control Elements (CEs) for secondary cell (SCell) activation and for semi-persistent (SP) Channel State Information (CSI) reporting activation on Physical Uplink Control Channel (PUCCH). A secondary cell may refer to a cell providing additional radio resources that may operate on a second frequency.

The method further includes the use of a MAC CE of SP CSI reporting deactivation on PUCCH. For example, in a first stage, two MAC CEs may initiate the SCell activation and start or initiate short CQI reporting. In a second stage, a MAC CE signals or triggers an end or deactivation of the short Channel Quality Indication (CQI) reporting. By virtue of two-stage based short CQI reporting, SCell activation delay can be fully controlled by configuration of SP CSI resources and reporting periodicity dedicated for short CQI reporting, which are independent from SMTC periodicity. As a result, SCell activation delay can be significantly reduced.

Figure 6:
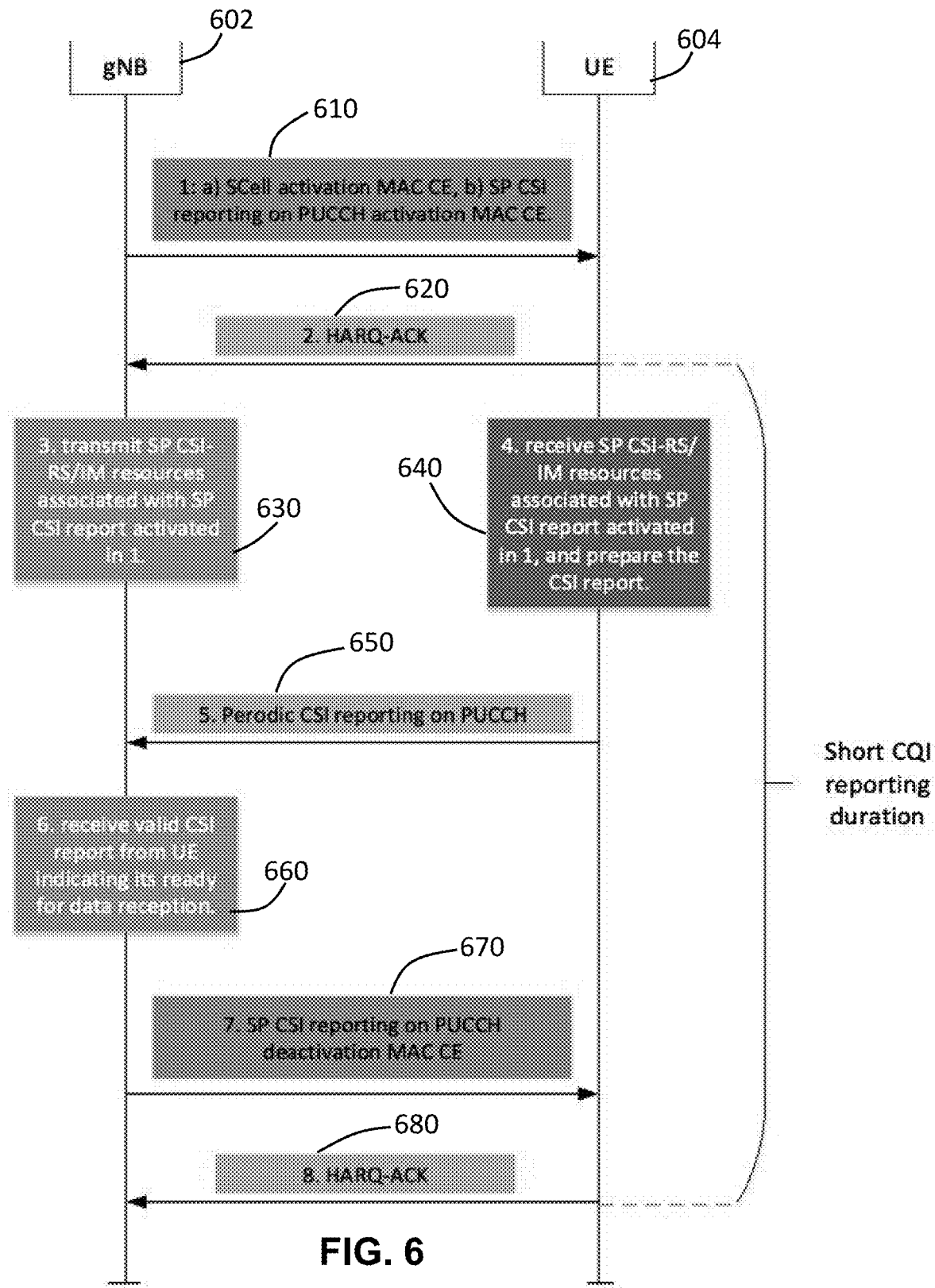
FIG. 6 shows an exemplary activity diagram, according to various embodiments.

FIG. 6 shows an exemplary method, e.g., a method related to implementing short Channel Quality Indication (CQI) reporting. In one or more examples, an access node device 602 (e.g., a base station, eNodeB, gNB, etc.) transmits two activations, one for secondary cell activation (SCell) and one for semi-persistent (SP) CSI reporting activation. The access node device may transmit these activations concurrently. For example, as shown in FIG. 6, at 610, a gNB 602 transmits a MAC protocol data unit (PDU) including at least two MAC CEs—one MAC CE for secondary cell (SCell) activation and one MAC CE for SP CSI reporting activation on Physical Uplink Control Channel (PUCCH). The MAC CE for SP CSI reporting activates a SP CSI reporting configuration to be performed by the mobile radio communication terminal device (e.g., UE). Further as shown, a mobile radio communication terminal device 604 (e.g., a user equipment (UE)), receives the MAC PDU with the at least two MAC CEs. This transmission may occur on a time slot designated n. A CSI report may (e.g., normally) contains wideband or subband channel quality indicator (CQI) for modulation coding scheme determination and precoder matrix indicator (PMI) for MIMO transmission.

The UE receives the two MAC CEs (a MAC CE for SCell activation and a MAC CE for SP CSI reporting activation) and sends an acknowledgment message to the access node device. In the example of FIG. 6, at 620, the UE 604, at time slot n+k1, sends/transmits a hybrid automatic repeat request acknowledgment (HARQ-ACK) in response to the gNB 604, which had sent the two MAC CEs. The scheduling of the HARQ-ACK transmission, e.g., at time slot n+k1, may be signaled in a downlink control information (DCI) sent from the access node device (e.g., gNB).

The method further includes the access node device (e.g., gNB) transmitting CSI resources and/or IM resources in response to receiving the acknowledgement message. For example, the access node device may transmit CSI-RS and/or IM reference signals (RS), e.g., CSI-RS and/or IM RS associated with the SCell being activated. As shown in in the example of FIG. 6, at 630, upon reception of the HARQ-ACK response from the UE 604, the gNB 602 starts to transmit the CSI resources and interference measurement (IM) resources associated with the activated SP CSI reporting configuration so as to enable the UE to perform the CSI calculation(s) and prepare or generate a CSI reporting. In accordance with various embodiment described herein, the CSI resources may be CSI reference signal(s) (RS) and/or IM reference signals. The transmission of the acknowledgment (ACK), can be considered as the beginning of the a short CQI reporting. In various embodiments, the periodicity of the transmission of SP CSI resources can be quite small, e.g., 2, 4 or 5 slots.

The method further includes, the mobile radio communication terminal device (e.g., UE) performing CSI calculation(s), and generating a CSI report based on the CSI calculation(s) in accordance with the CSI reporting configuration activated by the MAC CE for SP CSI reporting activation. That is, the mobile radio communication terminal device can generate a SP CSI report based on receives SP CSI resources, e.g., based on received SP CSI-RS and/or IM RS that are associated with SCell activated.

After the mobile radio communication terminal device generates the CSI report, the method includes sending or transmitting the CSI report to the access node device (e.g., gNB). In various embodiments, the mobile radio communication terminal device transmits the SP CSI report in PUCCH. Further, the mobile radio communication terminal device may periodically generate and transmit the CSI report periodically.

As shown in FIG. 6, the UE 604, at 640, receives SP CSI-Reference-Signal (CSI-RS) resources and/or interference measurement (IM) resources, and thus, based on the SP CSI reporting configuration activated by one of the received MAC CEs, e.g., by virtue of received SP CSI resources (e.g., based on the received reference signals), performs CSI calculation(s) and prepares the CSI report. Further, at 650, the UE 604 transmits the SP CSI reporting on PUCCH. As previous explained, the UE 604 may generate and transmit the SP CSI report periodically. Thus the gNB 602 receives the CSI reporting at 650. In various examples, the periodicity of the CSI reporting (e.g., on PUCCH) can be quite small, e.g. 2, 4, 5, etc. slots.

Further, in various embodiments of the present disclosure, after the transmission of the first CSI report on PUCCH, the mobile radio communication terminal device (e.g., UE) can start to monitor data scheduling in SCell.

Further, in accordance with exemplary embodiments, the access node device receives the CSI reports on PUCCH from the mobile radio communication terminal device. Based on the reception of the CSI reports, the access node device can determine that the SCell activation for the mobile radio communication terminal device is complete. That is, the access node device can determine that the mobile radio communication terminal device is ready to receive data transmission from the SCell based on the received CSI reports. In response to this determination, the access node device can perform channel schedule aware scheduling for data transmission to the mobile radio communication terminal device. As shown in FIG. 6, at 660, the gNB 602 determines or is informed about the SCell activation for the UE 604, and obtains further sufficient knowledge regarding the CSI due to the reception of the one or more CSI reports received on PUCCH from the UE 604. Also, as shown or indicated at 660, the gNB 604 conducts channel aware scheduling for the UE data transmission, in response to the SCell activation completion determination.

The method further includes the access node device sending or transmitting a MAC CE for deactivation of SP CSI reporting on PUCCH by the mobile radio communication terminal device to the mobile radio communication terminal device. As explained, the access node device transmits the MAC CE for deactivation of SP CSI reporting after determining/identifying at least one valid CSI report—e.g., a CSI report indicating to the access node that the UE is ready for data reception. Further, the mobile radio communication terminal device, in response to receiving the MAC for deactivation of SP CSI reporting, transmits or sends an acknowledgement and stops the SP CSI reporting.

For example, as shown in 670 of FIG. 6, the gNB 602 sends MAC CE for deactivation of SP CSI on PUCCH deactivation to the UE 604 so as to deactivate the short CQI reporting. Then, at 680, the UE 604 transmits a HARQ-ACK in response to the received MAC CE sent from the gNB 602 and stops the SP CSI reporting.

In various embodiments, depending on the subcarrier spacing of the SCell being activated, the resulting SCell activation delay can be reduced to under 10 milliseconds.

While the embodiment of FIG. 6 shows the interaction between a gNB and a UE, the embodiments herein may be considered separately from the perspective of an access node device (e.g., a base station device, eNodeB, gNB, etc.) and a mobile radio communication terminal device (e.g., a user equipment).

Figure 7:
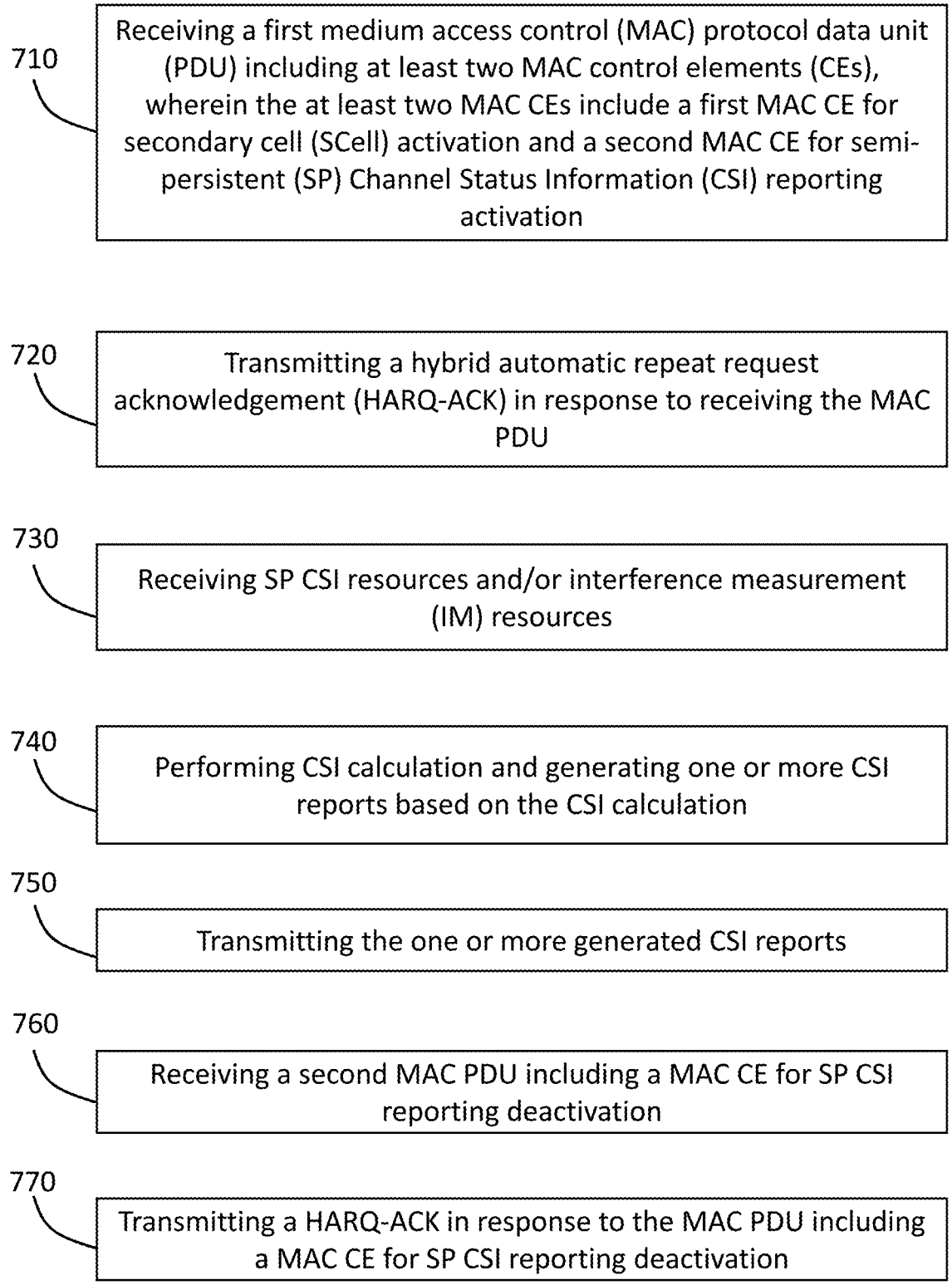
FIG. 7 shows an exemplary flow diagram, according to various embodiments.

That is in accordance with at least one exemplary embodiment of the present disclosure, FIG. 7 shows a method, e.g., a method that may be performed by a mobile radio communication terminal device (e.g., user equipment, wireless device, etc.). The method includes, at 710 receiving a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation. At 720, transmitting a hybrid automatic repeat request acknowledgement (HARQ-ACK) in response to receiving the MAC PDU. At 730, the method further includes receiving SP CSI resources and/or interference measurement (IM) resources. Then, at 740, the method includes performing CSI calculation(s) and generating one or more CSI reports based on the CSI calculation. As mentioned, in various embodiments, the CSI calculation and CSI report preparation/generation may be performed at one or more times, e.g., periodically. At 750, the method further includes transmitting the one or more generated CSI reports. Next, at 760, the method includes receiving a second MAC PDU including a MAC CE for SP CSI reporting deactivation and at 770, transmitting a HARQ-ACK in response to the MAC PDU including a MAC CE for SP CSI reporting deactivation.

Figure 8:
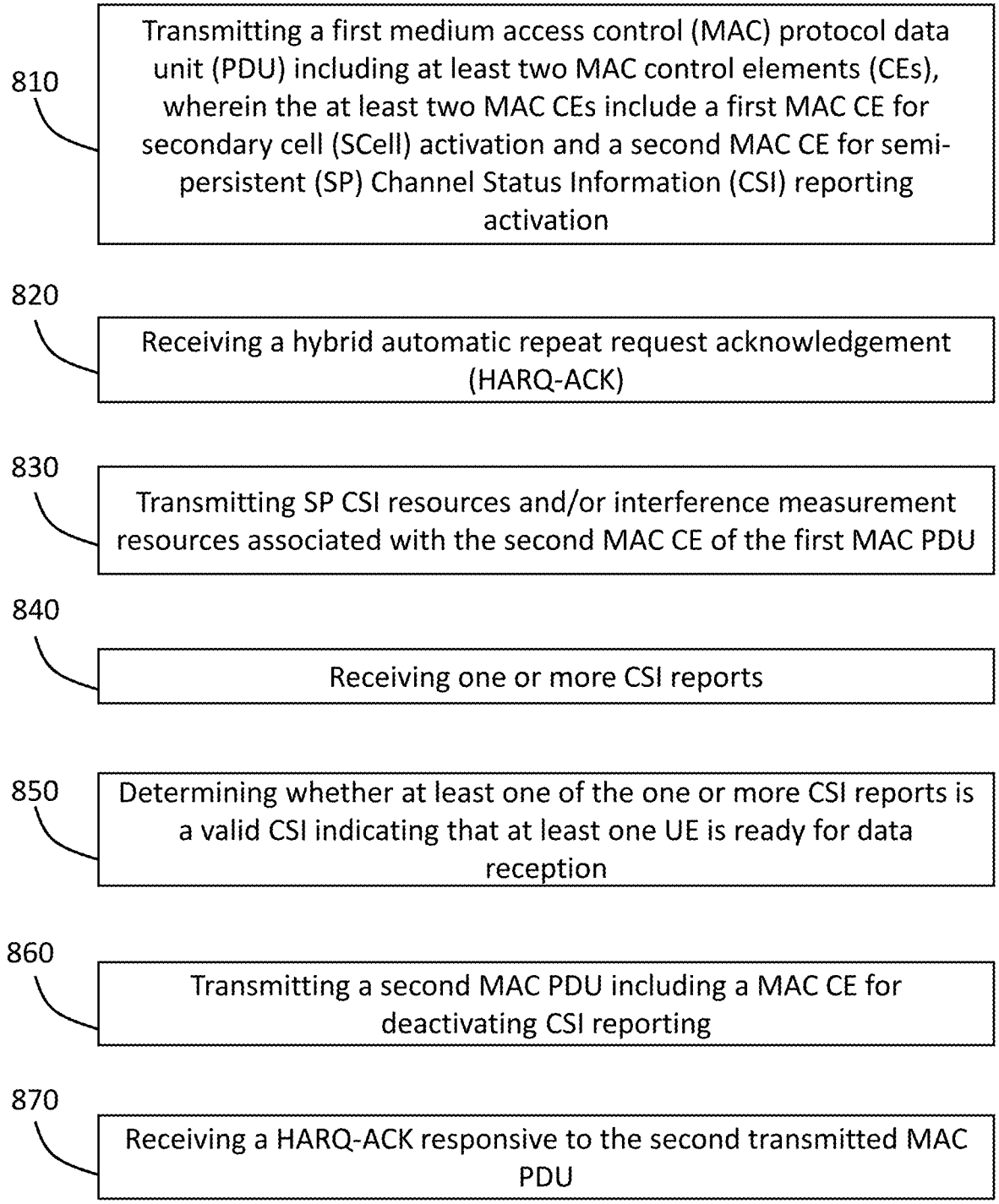
FIG. 8 shows an exemplary flow diagram, according to various embodiments.

Similarly, in accordance with at least one exemplary embodiment of the present disclosure, FIG. 8 shows a method that may be performed by an access node device (e.g., base station, eNodeB, gNB). The method includes, at 810, transmitting a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation. At 820, receiving a hybrid automatic repeat request acknowledgement (HARQ-ACK). Further, at 830, the method includes transmitting SP CSI resources and/or interference measurement resources associated with the second MAC CE of the first MAC PDU and at 840, receiving one or more CSI reports (e.g., periodically). Then, the method includes at 850, determining whether at least one of the one or more CSI reports is a valid CSI indicating that at least one UE is ready for data reception, and at 860, transmitting a second MAC PDU including a MAC CE for deactivation of CSI reporting. Then, at 870, the method includes receiving a HARQ-ACK in response to the transmitted MAC PDU, which indicates acknowledge of the end or cessation of the CSI reporting.

Figure 9:
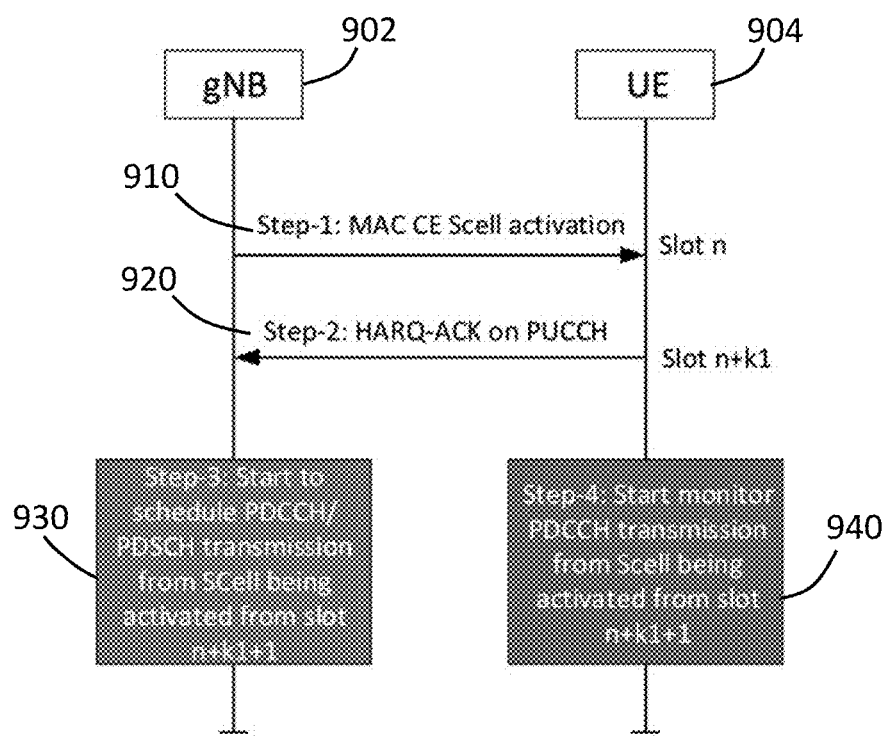
FIG. 9 shows an exemplary activity diagram, according to various embodiments.

In accordance with one or more exemplary embodiments of the present disclosure, a method, e.g., a method for enabling fast SCell activation/deactivation to reduce SCell activation and deactivation delay. The method may include transmission of a MAC CE SCell by an access node device (e.g., base station, eNodeB, gNB, etc.). As shown in the example FIG. 9, at 910, the method may include transmitting, by a gNB 902, a MAC CE SCell activation command at slot n. A mobile radio communication terminal device (e.g., UE) 904 receives the MAC CE for SCell activation in slot n. Then, in response, at 920, the UE 904 transmits a HARQ-ACK on PUCCH in slot n+k1, where k1 is an offset. In various embodiments, the access node device (e.g., gNB), signals the timing or slot offset, e.g., value of k1, for HARQ-ACK feedback in DCI. In one or exemplary embodiments, the access node device (e.g., gNB) may have or maintains a valid UE CSI report. That is, the UE may have transmitted previously (e.g., in last DRX (discontinuous reception periodicity or CSI reporting periodicity) a valid CSI report to gNB. Accordingly, since the valid CSI report was not received too long ago (CSI report was received less than predetermined time/slots ago) and the access node still maintains a valid CSI report or considers/identifies the last or a previous CSI report to be valid), the access node device can immediately schedule data transmission. Further, as shown in FIG. 9, at 930, the gNB 902 begins to schedule Physical Downlink Control Channel (PDCCH) and/or Physical Downlink Shared Channel (PDSCH) transmission from the activated SCell from or beginning at slot n+k1+1. In FIG. 9, at 940, the UE 904 monitors for PDCCH/PDSCH transmission from the SCell being at slot n+k1+1.

According to the above exemplary methods, SCell activation delay may be equal to k1+1 slots depending on particular parameters, instead of several tens milliseconds. Depending on the particular parameters of receiving MAC CE, for example, for 30 kHz Subcarrier Spacing (SCS), SCell activation delay can be 2 ms. For 60 kHz SCS, the SCell activation delay is reduced to equal to or approximately 1 ms. The resulting SCell activation delay may be significantly reduced by more than several tens of times.

Figure 10:
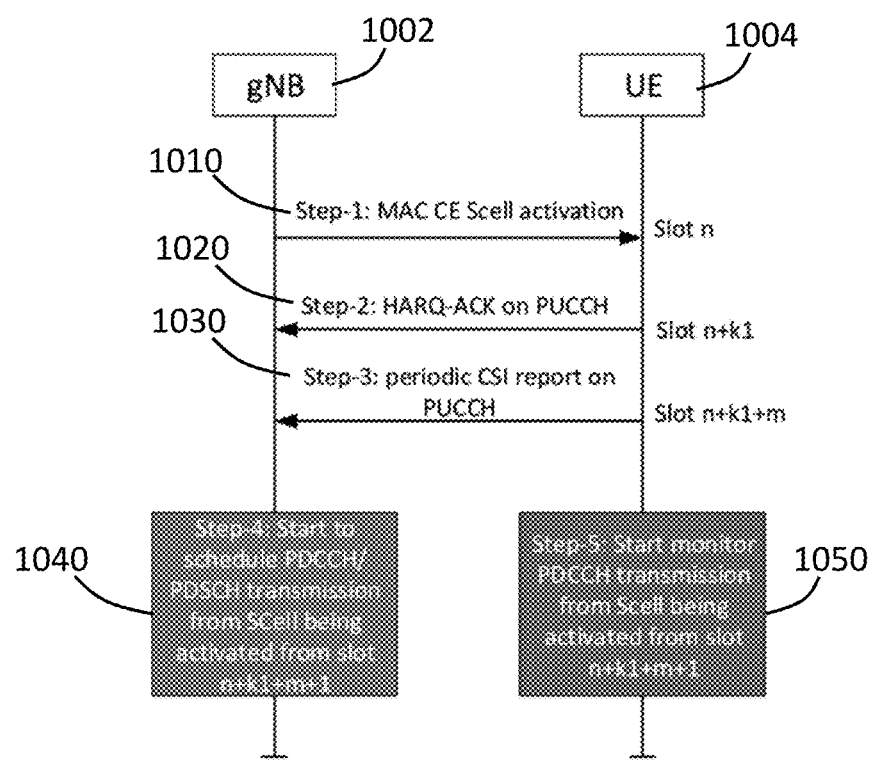
FIG. 10 shows an exemplary activity diagram, according to various embodiments.

In accordance with one or more exemplary embodiments of the present disclosure, another exemplary method for enabling fast SCell activation/deactivation to reduce SCell activation and deactivation delay may be shown in FIG. 10. As shown in FIG. 10, at 1010, the method includes transmitting, by a gNB 1002, a MAC CE SCell activation command at slot n. A mobile radio communication terminal device (e.g., UE) 1004 receives the MAC CE for SCell activation in slot n. Then, in response, at 1020, the UE 1004 transmits a HARQ-ACK on PUCCH in slot n+k1, where k1 is an offset. In various embodiments, the access node device (e.g., gNB), signals the timing, e.g., value of k1, for HARQ-ACK feedback in DCI. However, in this exemplary method the access node device (e.g., gNB) may not have or maintain a valid UE CSI report. Accordingly, in the example of FIG. 10, at 1030, the UE 1004, at slot n+k1+m, transmits a CSI report on Physical Uplink Control Channel (PUCCH), where m is a second offset. In other words, starting at slot n+k1+m, the UE 1004 begins to transmit the first of a series of periodic CSI reports on PUCCH. The second offset m, may be indicated in a previous Radio Resource Control (RRC) signaling sent by the access node device (e.g., gNB).

Then, in the example of FIG. 10, at 1040, the access node device (e.g., gNB) 502 schedules transmission (e.g., data transmission) in PDCCH and/or PDSCH from the SCell (e.g., the SCell associated or activated by the sent MAC CE) beginning at slot n+k+m+1. Similarly, at 1050 in FIG. 5, the UE 1004 begins to monitor for transmission in PDCCH and/or PDSCH beginning at slot n+k1+m+1.

Figure 11:
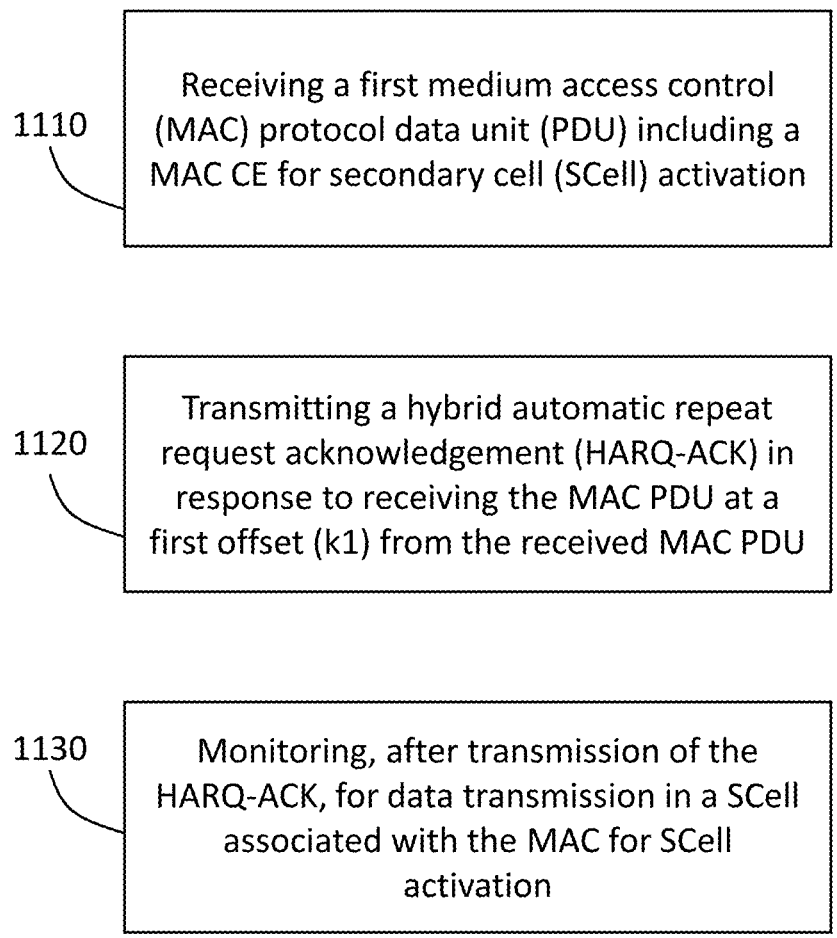
FIG. 11 shows an exemplary flow diagram, according to various embodiments.

The exemplary embodiments related to FIGS. 9 and 10 show the interaction between a gNB and a UE, the embodiments herein may be considered separately from the perspective of an access node device (e.g., a base station device, eNodeB, gNB, etc.) and a mobile radio communication terminal device (e.g., a user equipment, wireless device). For example, FIG. 11 shows a method that may be performed from a mobile radio communication terminal device (e.g., user equipment, wireless device) perspective. The method includes at 1110, receiving a first medium access control (MAC) protocol data unit (PDU) including a MAC CE for secondary cell (SCell) activation, at 1120, transmitting a hybrid automatic repeat request acknowledgement (HARQ-ACK) in response to receiving the MAC PDU at a first offset (k1) from the received MAC PDU, and 1130, monitoring, after transmission of the HARQ-ACK, for data transmission in a SCell associated with the MAC for SCell activation.

Figure 12:
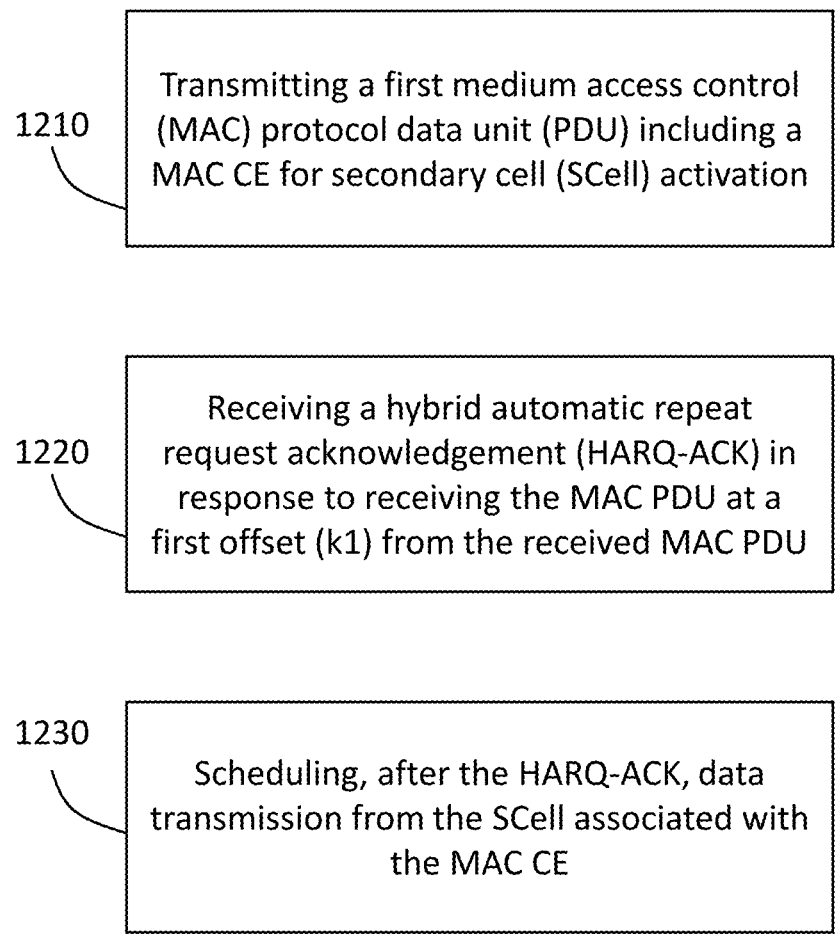
FIG. 12 shows an exemplary flow diagram, according to various embodiments.

Similarly, the exemplary embodiment of FIG. 12 is a method that may be performed from an access node device (e.g., base station, eNodeB, etc.) perspective and includes at 1210, transmitting a first medium access control (MAC) protocol data unit (PDU) including a MAC CE for secondary cell (SCell) activation, at 1220, receiving a hybrid automatic repeat request acknowledgement (HARQ-ACK) in response to receiving the MAC PDU at a first offset (k1) from the received MAC PDU, and at 1230, scheduling, after the HARQ-ACK, data transmission from the SCell associated with the MAC CE.

With respect to some of the exemplary embodiments of FIGS. 9-12, such methods may further include radio resource control (RRC) signaling. For example, the access node device may transmit an RRC signaling which configures the periodicity of CSI reporting e.g., the periodicity of CSI report transmission as described in FIGS. 10 and 12. That is, the mobile radio communication terminal device receives the RRC signaling which indicates or configures the periodicity of the CSI reporting to be done by the mobile radio communication terminal device. In various examples, the periodicity of the CSI reporting may be 10 slots.

Further, the value of m, the second offset, may be indicated or configured in a RRC signaling configuring sent from the access node device and received by the mobile radio terminal device. Such RRC signaling may be transmitted, for example, before transmission of the MAC CE for Scell activation.

Further, in various embodiments, the offset k1, may be indicated in a downlink control information. For example, the access node device may transmit the value k1 (e.g., in terms of number/amount of slots) in a DCI. The mobile radio communication terminal device receives the DCI and then may transmit, e.g., the HARQ-ACK according accordingly with the value of k1. In various examples, the k1 may be 1 to 3 slots.

Various exemplary embodiments described herein can significantly reduce the activation/deactivation delay of SCells. As a result, SCell activation/deactivation can be achieved at the slot level so that NR CA/DC procedure can operate more efficiently according to the traffic needs and bandwidth availability. Further, various exemplary embodiments described herein can enable fast CQI reporting during the initial period of SCell activation, so that SCell activation can be accomplished very fast. As a result, SCell activation/deactivation can be achieved at the slot level so that NR CA/DC procedure can operate more efficiently according to the traffic needs and bandwidth availability.

The following examples pertain to further exemplary implementations.

Example 1 is a method that may be implemented by a mobile radio communication terminal device, the method including receiving, a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation; transmitting a hybrid automatic repeat request acknowledgement (HARQ-ACK) in response to receiving the MAC PDU; receiving SP CSI resources and/or interference measurement (IM) resources; performing CSI calculation and generating one or more CSI reports based on the CSI calculation; transmitting the generated CSI reports; receiving a second MAC PDU including a MAC CE for SP CSI reporting deactivation; and transmitting a HARQ-ACK in response to the MAC PDU including a MAC CE for SP CSI reporting deactivation.

In Example 2, the method of Example 1, wherein generating the one or more CSI reports further includes performing a CSI calculation and generating a CSI report periodically and transmitting each of the periodically generated CSI reports.

In Example 3, the method of Example 2, further including monitoring, after transmitting a first generated CSI report, for data scheduling in at least one SCell.

In Example 4, the method of any of Examples 1 to 3, further including ceasing generation of the one or more CSI reports in response to the receiving the second MAC.

In Example 5, the method of any of Examples 1 to 4, wherein the one or more CSI reports are transmitted in a Physical Uplink Control Channel (PUCCH).

In Example, 6 the method of any of Examples 1 to 5, further including receiving, before receiving the first MAC PDU, downlink control information (DCI) indicating scheduling of HARQ-ACKs.

Example 7 is a method that may be implemented by an access node device, the method including transmitting a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation; receiving a hybrid automatic repeat request acknowledgement (HARQ-ACK); transmitting SP CSI resources and/or interference measurement resources associated with the second MAC CE of the first MAC PDU; receiving one or more CSI reports; determining whether at least one of the one or more CSI reports is a valid CSI indicating that at least one UE is ready for data reception; transmitting a second MAC PDU including a MAC CE for CSI reporting deactivation; and receiving a HARQ-ACK responsive to the second transmitted MAC PDU.

In Example 8, the method of Example 7, further including receiving the one or more CSI reports periodically.

In Example 9, the method of Example 7 or 8, wherein the one or more CSI reports are received in Physical Uplink Control Channel (PUCCH).

In Example 10, the method of any of Examples 7 to 9, further including transmitting, before transmission of the first MAC PDU, a downlink control information (DCI) indicating scheduling of HARQ-ACKs.

Example 11 is a non-transitory computer-readable medium containing instructions that when executed by at least one processor of a user equipment (UE) cause the UE to receive a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation; transmit a hybrid automatic repeat request acknowledgement (HARQ-ACK) in response to receiving the MAC PDU; receive SP CSI resources and/or interference measurement resources; perform a CSI calculation and generate one or more CSI reports based on the CSI calculation; transmit the one or more generated CSI reports; receive a second MAC PDU including a MAC CE for SP CSI reporting deactivation; and transmit a HARQ-ACK in response to the MAC PDU including a MAC CE for SP CSI reporting deactivation.

In Example 12, the computer-readable medium of Example 11, wherein the generating of the CSI report includes causing the UE to perform a CSI calculation and generate a CSI report periodically and to transmit each of the periodically generated CSI reports.

In Example 13, the computer-readable medium of Example 12, wherein the instructions further cause the UE to monitor, after transmission of a first generated CSI report, for data scheduling in at least one SCell.

In Example 14, the computer-readable medium of any of Examples 11 to 13, wherein the instructions further cause the UE to cease generation of CSI reports in response to the receiving the second MAC.

In Example 15, the computer-readable medium of any of Examples 11 to 14, wherein the one or more CSI reports are received in Physical Uplink Control Channel (PUCCH).

In Example 16, the computer-readable medium of any of Examples 11 to 15, wherein the instructions further cause the UE to receive, before receiving the first MAC PDU, downlink control information (DCI) indicating scheduling of HARQ-ACKs.

Example 17 is a non-transitory computer-readable medium containing instructions that when executed by at least one processor of a base station cause the base station to transmit a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation; receive a hybrid automatic repeat request acknowledgement (HARQ-ACK); transmit SP CSI resources and/or interference measurement resources associated with the second MAC CE of the first MAC PDU; receive one or more CSI reports; determine whether at least one of the one or more CSI reports is a valid CSI indicating that at least one UE is ready for data reception; transmit a second MAC PDU including a MAC CE for deactivating CSI reporting; and receive a HARQ-ACK responsive to the second transmitted MAC PDU.

In Example 18, the computer-readable medium of Example 17, wherein the instructions further cause the base station to receive the one or more CSI reports periodically.

In Example 19, the computer-readable medium of Example 17 or 18, wherein the one or more CSI reports are received in Physical Uplink Control Channel (PUCCH).

In Example 20, the computer-readable medium of any of Examples 17 to 19, wherein the instructions further cause the base station to transmit, before transmission of the first MAC PDU, a downlink control information (DCI) indicating scheduling of HARQ-ACKs.

Example 21, is an apparatus to be implemented in user equipment (UE), the apparatus including interface circuitry; and processing circuitry, operably coupled to the interface circuitry, and configured to: receive, via the interface circuitry, a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation; transmit, via the interface circuitry, a hybrid automatic repeat request acknowledgement (HARQ-ACK) in response to receiving the MAC PDU; receive, via the interface circuitry, SP CSI resources and/or interference measurement resources; perform CSI calculation and generating one or more CSI reports based on the CSI calculation; transmit, via the interface circuitry, the one or more generated CSI reports; receive, via the interface circuitry, a second MAC PDU including a MAC CE for SP CSI reporting deactivation; and transmit, via the interface circuitry, a HARQ-ACK in response to the MAC PDU including a MAC CE for SP CSI reporting deactivation.

In Example 22, the apparatus of Example 21, wherein the processing circuitry is further configured to generate a CSI report periodically and to transmit, via the interface circuitry, each of the periodically generated CSI reports.

In Example 23, the apparatus of Example 22, wherein the processing circuitry is further configured to monitor, via the interface circuitry, after transmission of a first generated CSI report, for data scheduling in at least one SCell.

In Example 24 the apparatus of any of Examples 21 to 23, wherein the processing circuitry is further configured to cease generation of CSI reports in response to the receiving the second MAC.

In Example 25, the apparatus of any of Examples 21 to 24, wherein the one or more CSI reports are transmitted in a Physical Uplink Control Channel (PUCCH).

In Example 26, the apparatus of any of Examples 21 to 25, wherein the processing circuitry is further configured to receive, via the interface circuitry, before receiving the first MAC PDU, downlink control information (DCI) indicating scheduling of HARQ-ACKs.

Example 27 is an apparatus to be implemented in a base station, the apparatus including interface circuitry; and processing circuitry, operably coupled to the interface circuitry, configured to transmit, via the interface circuitry, a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation; receive, via the interface circuitry, a hybrid automatic repeat request acknowledgement (HARQ-ACK); transmit, via the interface circuitry, SP CSI resources and/or interference measurement resources associated with the second MAC CE of the first MAC PDU; receive, via the interface circuitry, one or more CSI reports; determine whether at least one of the one or more CSI reports is a valid CSI indicating that at least one UE is ready for data reception; transmit, via the interface circuitry, a second MAC PDU including a MAC CE for deactivating CSI reporting; and receive, via the interface circuitry, a HARQ-ACK responsive to the second transmitted MAC PDU.

In Example 28, the apparatus of Example 27, wherein the processing circuitry is further configured to receive the one or more CSI reports periodically.

In Example 29, the apparatus of Example 27 or 28, wherein the one or more CSI reports are received in Physical Uplink Control Channel (PUCCH).

In Example 30, the apparatus of any of Examples 27 to 29, wherein the processing circuitry is further configured to transmit, via the interface circuitry, before transmission of the first MAC PDU, a downlink control information (DCI) indicating scheduling of HARQ-ACKs.

Example 31 is a method that may be implemented by a mobile radio communication terminal device, the method including: receiving a first medium access control (MAC) protocol data unit (PDU) including a MAC (control element) CE for secondary cell (SCell) activation; transmitting a hybrid automatic repeat request acknowledgement (HARQ-ACK) in response to receiving the MAC PDU at a first offset (k1) from the received MAC PDU; monitoring, after transmission of the HARQ-ACK, for data transmission in a SCell.

In Example 32, the method of Example 31, wherein a total offset measured from receiving the first MAC PDU to the monitoring for data transmission is less than or equal to 2 milliseconds.

In Example 33, the method of Example 31 or 32, wherein the monitoring begins one slot after the first transmitted CSI report.

In Example 34, the method of any of Examples 31 to 33, further including: transmitting a channel state information (CSI) report periodically, wherein a first CSI report is transmitted at a second offset (m) from the transmitted HARQ-ACK, and wherein the monitoring for data transmission is one slot after transmission of the first CSI report.

In Example 35, the method of Example 34, wherein the second offset m is at least 1 time/transmission slot.

In Example 36, the method of Example 34 or 35, further including receiving a Radio Resource Control (RRC) signaling indicating or configuring a periodicity of the CSI report transmission.

In Example 37, the method of any of Examples 34 to 36, further including, receiving a downlink control information (DCI) configuring the first offset k1, wherein the first offset k1 is between 1 and 3 time/transmission slots.

In Example 38, the method of any of Examples 34 to 37, wherein a total offset measured from receiving the first MAC PDU to the monitoring for data transmission is less than or equal to 10 milliseconds.

In Example 39, the method of Example 38, wherein the total offset is between 4 and 10 milliseconds.

In Example 40, the method of any of Examples 34 to 39, further including receiving, before receiving the first MAC PDU, a Radio Resource Control signaling indicating the second offset m.

In Example 41, the method of any of Examples 34 to 40, further including receiving, before transmitting the CSI report, a configuration of periodic Channel Status Information reference signal (CSI-RS) resources and/or interference measurement (IM) resources associated with the SCell.

In Example 42, the method of any of Examples 31 to 41, wherein the monitoring includes monitoring for PDCCH and/or PDSCH transmission from the SCell.

In Example 43, the method of any of Examples 31 to 42, wherein prior to receiving the first MAC PDU, transmitting a valid CSI report indicating the UE is ready for data transmission.

Example 44 is a method that may be implemented by an access node device, the method including transmitting a first medium access control (MAC) protocol data unit (PDU) including a MAC CE for secondary cell (SCell) activation; receiving a hybrid automatic repeat request acknowledgement (HARQ-ACK) in response to receiving the MAC PDU at a first offset (k1) from the received MAC PDU; scheduling, after the HARQ-ACK, data transmission from the SCell associated with the MAC CE.

In Example 45, the method of Example 44, wherein scheduling for data transmission in the SCell includes scheduling transmission in a physical downlink control channel (PDCCH) and/or in a physical downlink shared channel (PDSCH).

In Example 46, the method of Example 44 or 45, wherein the scheduling the data transmission is in the SCell begins in a slot after reception of the HARQ-ACK.

In Example 47, the method of any of Examples 44 to 46, further including receiving a channel state information (CSI) report periodically, wherein a first CSI report is received at a second offset (m) from the HARQ-ACK, and wherein the scheduling data transmission occurs after reception of the first received CSI report.

In Example 48, the method of Example 47, wherein the second offset m is at least 1 time/transmission slot.

In Example 49, the method of Example 47 or 48, further including transmitting a radio resource control (RRC) signaling, wherein the RRC signaling configures a periodicity of the CSI report transmission.

In Example 50, the method of any of Examples 47 to 49, further including transmitting downlink control information (DCI), wherein the DCI configures the first offset k1.

In Example 51, the method of any of Examples 47 to 50, wherein a total offset measured from receiving the first MAC PDU to the scheduling for data transmission is less than or equal to 10 milliseconds.

In Example 52, the method of Example 51, wherein the total offset is between 4 and 10 milliseconds.

In Example 53, the method of any of Examples 47 to 52, further including transmitting, before transmission of the first MAC PDU, a Radio Resource Control signaling indicating the second offset m.

In Example 54, the method of any of Examples 47 to 53, further including transmitting, before reception of the first CSI report, configuration of periodic Channel Status Information (CSI) resources and/or interference measurement (IM) resources associated with the SCell.

In Example 55, the method of any of Examples 44 to 54, wherein the scheduling includes scheduling for transmission in a PDCCH and/or PDSCH from the SCell.

In Example 56, the method of any of Examples 44 to 55, further including, obtaining prior to transmitting the first MAC PDU, a valid CSI report indicating at least one UE is ready for data transmission from the SCell.

Example 57 is a non-transitory computer-readable medium containing instructions that when executed by at least one processor of a user equipment (UE) cause the UE to: receive a first medium access control (MAC) protocol data unit (PDU) including a MAC CE for secondary cell (SCell) activation; transmit a hybrid automatic repeat request acknowledgement (HARQ-ACK) in response to receiving the MAC PDU at a first offset (k1) from the received MAC PDU; and monitor, after transmission of the HARQ-ACK, for data transmission in a SCell.

In Example 58, the computer-readable medium of Example 57, wherein a total offset measured from receiving the first MAC PDU to the monitoring for data transmission is less than or equal to 2 milliseconds.

In Example 59, the computer-readable medium of Example 57 or 58, wherein the UE is caused to start to monitor one slot after the HARQ-ACK.

In Example 60, the computer-readable medium of any of Examples 57 to 59, wherein the instructions further cause the UE to transmit a channel state information (CSI) report periodically, wherein a first CSI report is transmitted at a second offset (m) from the transmitted HARQ-ACK, and wherein the UE is caused to monitor for data transmission one slot after transmission of the first CSI report.

In Example 61, the computer-readable medium of Example 60, wherein the second offset m is at least 1 slot.

In Example 62, the computer-readable medium of Example 60 or 61, wherein a periodicity of the CSI report transmission is 10 time/transmission slots.

In Example 63, the computer-readable medium of any of Examples 60 to 62, wherein the instructions further cause the UE to receive a downlink control information (DCI) configuring the first offset k1 to be between 1 and 3 time/transmission slots.

In Example 64, the computer-readable medium of any of Examples 60 to 63, wherein a total offset measured from receiving the first MAC PDU to the monitoring for data transmission is less than or equal to 10 milliseconds.

In Example 65, the computer-readable medium of Example 64, wherein the total offset is between 4 and 10 milliseconds.

In Example 66, the computer-readable medium of any of Examples 60 to 65, wherein the instructions further cause the UE to receive, before reception the first MAC PDU, a Radio Resource Control signaling indicating the second offset m.

In Example 67, the computer-readable medium of any of Examples 60 to 66, wherein the instructions further cause the UE to receive, before transmission of the first CSI report, a configuration of periodic Channel Status Information (CSI) resources and/or interference measurement (IM) resources associated with the SCell.

In Example 68, the computer-readable medium of any of Examples 57 to 67, wherein the monitoring includes monitoring for PDCCH and/or PDSCH transmission from the SCell.

In Example 69, the computer-readable medium of any of Examples 57 to 68, wherein prior to reception the first MAC PDU, the instructions further cause the UE to transmit a valid CSI report indicating the UE is ready for data transmission.

Example 70 is a non-transitory computer-readable medium containing instructions that when executed by at least one processor of a base station cause the base station to transmit a first medium access control (MAC) protocol data unit (PDU) including a MAC CE for secondary cell (SCell) activation; receive a hybrid automatic repeat request acknowledgement (HARQ-ACK) in response to receiving the MAC PDU at a first offset (k1) from the received MAC PDU; and schedule, after the HARQ-ACK, data transmission from a SCell associated with the MAC CE.

In Example 71, the computer-readable medium of Example 70, wherein the instructions cause the base station to schedule for data transmission in a physical downlink control channel (PDDCH) and/or in a physical downlink shared channel (PDSCH).

In Example 72, the computer-readable medium of Example 70 or 71, wherein the instructions further cause the base station to schedule data transmission in the SCell beginning in a slot after reception of the HARQ-ACK.

In Example 73, the computer-readable medium of any of Examples 70 to 72, wherein the instructions further cause the base station to receive a channel state information (CSI) report periodically, wherein a first CSI report is received at a second offset (m) from the HARQ-ACK, and schedule the data transmission after reception of the first received CSI report.

In Example 74, the computer-readable medium of Example 73, wherein the second offset m is at least 1 time/transmission slot.

In Example 75, the computer-readable medium of Example 73 or 74, wherein the instructions further cause the base station to transmit a Radio Resource Control (RRC) signaling, wherein the RRC signaling configures a periodicity of the CSI report transmission.

In Example 76, the computer-readable medium of any of Examples 73 to 75, wherein the instructions further cause the base station to transmit a downlink control information (DCI), wherein the DCI configures the first offset k1 to be between 1 and 3 time/transmission slots.

In Example 77, the computer-readable medium of any of Examples 73 to 76, wherein a total offset measured from transmission of the first MAC PDU to scheduling data transmission is less than or equal to 10 milliseconds.

In Example 78, the computer-readable medium of Example 77, wherein the total offset is between 4 and 10 milliseconds.

In Example 79, the computer-readable medium of any of Examples 73 to 78, wherein the instructions further cause the base station to transmit, before transmission of the first MAC PDU, a Radio Resource Control (RRC) signaling indicating the second offset m.

In Example 80, the computer-readable medium of any of Examples 73 to 79, wherein the instructions further cause the base station to transmit, before reception of the first CSI report, a configuration of periodic Channel Status Information (CSI) resources and/or interference measurement resources associated with the SCell.

In Example 81, the computer-readable medium of any of Examples 70 to 80, wherein the instructions further cause the base station to the schedule data transmission in a physical downlink control channel (PDCCH) and/or PDSCH from the SCell.

In Example 82, the computer-readable medium of any of Examples 70 to 81, wherein the instructions further cause the base station to obtain prior to transmitting the first MAC PDU, a valid CSI report indicating at least one UE is ready for data transmission from the SCell.

Example 83 is an apparatus to be implemented in user equipment (UE), the apparatus including interface circuitry; and processing circuitry operably coupled to the interface circuitry and configured to: receive, via the interface circuitry, a first medium access control (MAC) protocol data unit (PDU) including a MAC CE for secondary cell (SCell) activation; transmit, via the interface circuitry, a hybrid automatic repeat request acknowledgement (HARQ-ACK) in response to receiving the MAC PDU at a first offset (k1) from the received MAC PDU; monitor, after transmission of the HARQ-ACK, for data transmission in a SCell.

In Example 84, the apparatus of Example 83, wherein a total offset measured from receiving the first MAC PDU to the monitoring for data transmission is less than or equal to 2 milliseconds.

In Example 85, the apparatus of Example 83 or 84, wherein the processing circuitry is further configured to start to monitor one slot after the HARQ-ACK.

In Example 86, the apparatus of any of Examples 83 to 85, wherein the processing circuitry is further configured to: transmit, via the interface circuitry, a channel state information (CSI) report periodically, wherein a first CSI report is transmitted at a second offset (m) from the transmitted HARQ-ACK, and wherein the processing circuitry is configured to, via the interface circuitry, monitor for data transmission after transmission of the first CSI report.

In Example of 87, the apparatus of Example 86, wherein the second offset m is at least 1 time/transmission slot.

In Example 88, the apparatus of Example 86 or 87, wherein the processing circuitry is further configured to receive, via the interface circuitry, a Radio Resource Control (RRC) signaling configuring a periodicity of the one or more CSI reports.

In Example 89, the apparatus of any of Examples 86 to 88, wherein the processing circuitry is further configured to receive, via the interface circuitry, a downlink control information (DCI) configuring the first offset k1 to be between 1 and 3 time/transmission slots.

In Example 90, the apparatus of any of Examples 86 to 89, wherein a total offset measured from receiving the first MAC PDU to the monitoring for data transmission is less than or equal to 10 milliseconds.

In Example 91, the apparatus of Example 90, wherein the total offset is between 4 and 10 milliseconds.

In Example 92, the apparatus of any of Examples 86 to 91, wherein the processing circuitry is further configured to: receive, via the interface circuitry before reception the first MAC PDU, a Radio Resource Control signaling indicating the second offset m.

In Example 93, the apparatus of any of Examples 86 to 92, wherein the processing circuitry is further configured to: receive, before transmission of the first CSI report, a configuration of periodic Channel Status Information (CSI) resources and/or interference measurement (IM) resources associated with the SCell.

In Example 94, the apparatus of any of Examples 83 to 93, wherein the processing circuitry is configured to monitor for PDCCH and/or PDSCH transmission from the SCell.

In Example 95, the apparatus of any of Examples 83 to 94, wherein prior to reception the first MAC PDU, the processing circuitry is configured to transmit, via the interface circuitry, a valid CSI report indicating the UE is ready for data transmission.

Example 96 is an apparatus to be implemented in a base station, the apparatus including: interface circuitry; and processing circuitry, operably coupled to the interface circuitry, and configured to: transmit, via the interface circuitry, a first medium access control (MAC) protocol data unit (PDU) including a MAC CE for secondary cell (SCell) activation; receive, via the interface circuitry, a hybrid automatic repeat request acknowledgement (HARQ-ACK) in response to receiving the MAC PDU at a first offset (k1) from the received MAC PDU;

and schedule, after the HARQ-ACK, data transmission from a SCell associated with the MAC CE.

In Example 97, the apparatus of Example 96, wherein the processing circuitry is configured to schedule for data transmission in a PDDCH and/or in a PDSCH.

In Example 98, the apparatus of Example 96 or 97, wherein the processing circuitry is further configured to schedule the data transmission in the SCell begins in a slot after reception of the HARQ-ACK.

In Example 99, the apparatus of any of Examples 96 to 98, wherein the processing circuitry is further configured to: receive, via the interface circuitry, a channel state information (CSI) report periodically, wherein a first CSI report is received at a second offset (m) from the HARQ-ACK, and schedule the data transmission after reception of the first received CSI report or first valid received CSI report.

In Example 100, the apparatus of Example 99, wherein the second offset m is at least 1 time/transmission slot.

In Example 101, the apparatus of Example 99 or 100, wherein the processing circuitry is further configured to transmit a radio resource control (RRC) signaling, wherein the RRC signaling configures a periodicity of the CSI report transmission.

In Example 102, the apparatus of any of Examples 99 to 101, wherein the processing circuitry is further configured to transmit a downlink control information (DCI), wherein the DCI configures the first offset k1 to be between 1 and 3 time/transmission slots.

In Example 103, the apparatus of any of Examples 99 to 102, wherein a total offset measured from transmission of the first MAC PDU to scheduling data transmission is less than or equal to 10 milliseconds.

In Example 104, the apparatus of Example 103, wherein the total offset is between 4 and 10 milliseconds.

In Example 105, the apparatus of any of Examples 99 to 104, wherein the processing circuitry is further configured to transmit, via the interface circuitry before transmission of the first MAC PDU, a Radio Resource Control signaling indicating the second offset m.

In Example 106, the apparatus of any of Examples 99 to 105, wherein the processing circuitry is further configured to transmit, via the interface circuitry before reception of the first CSI report, a configuration of periodic Channel Status Information (CSI) resources and/or interference measurement (IM) resources associated with the SCell.

In Example 107, the apparatus of any of Examples 96 to 106, wherein the processing circuitry is further configured to the schedule data transmission in a PDCCH and/or PDSCH from the SCell.

In Example 108, the apparatus of any of Examples 96 to 107, wherein the processing circuitry is further configured to obtain prior to transmitting the first MAC PDU, a valid CSI report indicating at least one UE is ready for data transmission from the SCell.

It should be noted that one or more of the features of any of the examples above may be combined with any one of the other examples.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus to be implemented in a base station, the apparatus comprising:
   interface circuitry; and
   processing circuitry operably coupled to the interface circuitry, the processing circuitry configured to:
   transmit, via the interface circuitry, a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation;
   receive, via the interface circuitry, a hybrid automatic repeat request acknowledgement (HARQ-ACK);
   transmit, via the interface circuitry, SP CSI reference signal (RS) resources and/or interference measurement RS resources associated with the second MAC CE of the first MAC PDU;
   receive, via the interface circuitry, one or more CSI reports; determine whether at least one of the one or more CSI reports is a valid CSI indicating that at least one UE is ready for data reception;
   transmit, via the interface circuitry, a second MAC PDU including a MAC CE for deactivating CSI reporting; and
   receive, via the interface circuitry, a HARQ-ACK responsive to the second transmitted MAC PDU.

2. The apparatus of claim 1, wherein the processing circuitry is configured to receive the one or more CSI reports periodically.

3. The apparatus of claim 1, wherein the processing circuitry is configured to receive the one or more CSI reports in Physical Uplink Control Channel (PUCCH).

4. The apparatus of claim 1, wherein the processing circuitry is configured to transmit, via the interface circuitry, before transmission of the first MAC PDU, a downlink control information (DCI) indicating scheduling of HARQ-ACKs.

5. A non-transitory computer-readable medium containing instructions that when executed by at least one processor of a base station cause the base station to:
   transmit a first medium access control (MAC) protocol data unit (PDU) including at least two MAC control elements (CEs), wherein the at least two MAC CEs include a first MAC CE for secondary cell (SCell) activation and a second MAC CE for semi-persistent (SP) Channel Status Information (CSI) reporting activation;
   receive a hybrid automatic repeat request acknowledgement (HARQ-ACK);
   transmit SP CSI resources and/or interference measurement resources associated with the second MAC CE of the first MAC PDU;
   receive one or more CSI reports; determine whether at least one of the one or more CSI reports is a valid CSI indicating that at least one UE is ready for data reception;
   transmit a second MAC PDU including a MAC CE for deactivating CSI reporting; and
   receive a HARQ-ACK responsive to the second transmitted MAC PDU.

6. The computer-readable medium of claim 5, wherein the instructions further cause the base station to receive the one or more CSI reports periodically.

7. The computer-readable medium of claim 5, wherein the one or more CSI reports are received in Physical Uplink Control Channel (PUCCH).

8. The computer-readable medium of claim 5, wherein the instructions further cause the base station to transmit, before transmission of the first MAC PDU, a downlink control information (DCI) indicating scheduling of HARQ-ACKs.

9. An apparatus to be implemented in a base station, the apparatus comprising:
   interface circuitry; and
   processing circuitry, operably coupled to the interface circuitry, the processing circuitry configured to:
      transmit, via the interface circuitry, a first medium access control (MAC) protocol data unit (PDU) including a MAC CE for secondary cell (SCell) activation;
      receive, via the interface circuitry, a hybrid automatic repeat request acknowledgement (HARQ-ACK) in response to receiving the MAC PDU at a first offset (k1) from the received MAC PDU; and
      schedule, after the HARQ-ACK, data transmission from a SCell associated with the MAC CE,
   wherein the processing circuitry is to further obtain prior to transmitting the first MAC PDU, a valid CSI report indicating at least one UE is ready for data transmission from the SCell.

10. The apparatus of claim 9, wherein the processing circuitry is configured to schedule the data transmission in a physical downlink control channel (PDDCH) and/or in a physical downlink shared channel (PDSCH).

11. The apparatus of claim 9, wherein the processing circuitry is further configured to schedule the data transmission in the SCell beginning in a slot after reception of the HARQ-ACK.

12. The apparatus of claim 9, wherein the processing circuitry is further configured to:
   receive, via the interface circuitry, a channel state information (CSI) report periodically, wherein a first CSI report is received at a second offset (m) from the HARQ-ACK, and
   schedule the data transmission after reception of the first received CSI report or first valid received CSI report.

13. The apparatus of claim 12, wherein the second offset (m) is at least 1 time/transmission slot.

14. The apparatus of claim 12, wherein the processing circuitry is further configured to transmit a radio resource control (RRC) signaling, wherein the RRC signaling configures a periodicity of the CSI report transmission.

15. The apparatus of claim 12, wherein the processing circuitry is further configured to transmit a downlink control information (DCI), wherein the DCI configures the first offset (k1) to be between 1 and 3 time/transmission slots.

16. The apparatus of any of claim 12, wherein a total offset measured from transmission of the first MAC PDU to scheduling the data transmission is less than or equal to 10 milliseconds.

17. The apparatus of claim 12, wherein the processing circuitry is to further transmit, via the interface circuitry, before transmission of the first MAC PDU, a radio resource control (RRC) signaling indicating the second offset (m).

18. The apparatus of claim 12, wherein the processing circuitry is further configured to transmit, via the interface circuitry, before reception of the first CSI report, a configuration of periodic channel status information (CSI) resources and/or interference measurement (IM) resources associated with the SCell.

19. A non-transitory computer-readable medium containing instructions that when executed by at least one processor of a base station cause the base station to:
   transmit a first medium access control (MAC) protocol data unit (PDU) including a MAC CE for secondary cell (SCell) activation;
   receive a hybrid automatic repeat request acknowledgement (HARQ-ACK) in response to receiving the MAC PDU at a first offset (k1) from the received MAC PDU;
   schedule, after the HARQ-ACK, data transmission from a SCell associated with the MAC CE;
   receive a channel state information (CSI) report periodically, wherein a first CSI report is received at a second offset (m) from the HARQ-ACK, and
   schedule the data transmission after reception of the first received CSI report.

20. The computer-readable medium of claim 19, wherein the instructions cause the base station to schedule the data transmission in a physical downlink control channel (PDDCH) and/or in a physical downlink shared channel (PDSCH).

21. The computer-readable medium of claim 19, wherein the instructions further cause the base station to schedule the data transmission in the SCell beginning in a slot after reception of the HARQ-ACK.

22. The computer-readable medium of claim 19, wherein the second offset (m) is at least 1 time/transmission slot.

23. The computer-readable medium of claim 19, wherein the instructions further cause the base station to transmit a radio resource control (RRC) signaling, wherein the RRC signaling configures a periodicity of the CSI report transmission.

* * * * *